(12) United States Patent
Bender et al.

(10) Patent No.: US 7,822,414 B2
(45) Date of Patent: Oct. 26, 2010

(54) CONNECTION FAILURE REPORTING IN WIRELESS COMMUNICATION SYSTEMS

(75) Inventors: Paul E. Bender, San Diego, CA (US); Ramin Rezaiifar, San Diego, CA (US); Abhay Arvind Joshi, San Diego, CA (US); James A. Hutchison, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 710 days.

(21) Appl. No.: 11/407,571

(22) Filed: Apr. 19, 2006

(65) Prior Publication Data

US 2006/0246888 A1 Nov. 2, 2006

Related U.S. Application Data

(60) Provisional application No. 60/672,577, filed on Apr. 19, 2005.

(51) Int. Cl.
*H04W 24/00* (2009.01)
(52) U.S. Cl. .................. 455/423; 455/421; 455/424; 455/425
(58) Field of Classification Search .................. None
See application file for complete search history.

(56) References Cited

U.S. PATENT DOCUMENTS

| | | | |
|---|---|---|---|
| 6,088,588 A | | 7/2000 | Osborne |
| 6,163,692 A | * | 12/2000 | Chakrabarti et al. ........ 455/416 |
| 6,175,732 B1 | | 1/2001 | McDaniel et al. |
| 6,317,596 B1 | | 11/2001 | Elwin |
| 6,466,660 B1 | * | 10/2002 | Merriam ................ 379/126 |
| 7,127,213 B2 | | 10/2006 | Haymes et al. |
| 7,305,236 B2 | | 12/2007 | Schwinke et al. |
| 2001/0016489 A1 | * | 8/2001 | Haymes et al. .......... 455/423 |
| 2004/0203728 A1 | | 10/2004 | Schwinke et al. |
| 2005/0250440 A1 | * | 11/2005 | Zhou et al. .............. 455/12.1 |

FOREIGN PATENT DOCUMENTS

EP 1 465 446 A1 10/2004

OTHER PUBLICATIONS

International Search Report and Written Opinion - PCT/US2006/014890, International Search Authority - European Patent Office - Oct. 20, 2006.
Taiwanese Search Report - TW095113961 - Search Authority - TIPO - Apr. 24, 2009.

* cited by examiner

*Primary Examiner*—Erika A Gary
(74) *Attorney, Agent, or Firm*—Jian Ma; Kam T. Tam

(57) ABSTRACT

Embodiments disclosed herein relate to methods and systems for reporting and compiling connection failures in wireless communication systems. In an embodiment, when an access terminal experiences a connection failure (e.g., an unintended one), the access terminal may generate a connection failure record associated with the event, and send a message containing the connection failure record to an access network it has since established the connection. The access network may send a message containing a connection failure report acknowledgement (ACK) message to the access terminal, upon reception of the connection failure report message. The network operators may use the connection failure records thus compiled to identify problematic spots in the system and improve the quality of service.

27 Claims, 7 Drawing Sheets

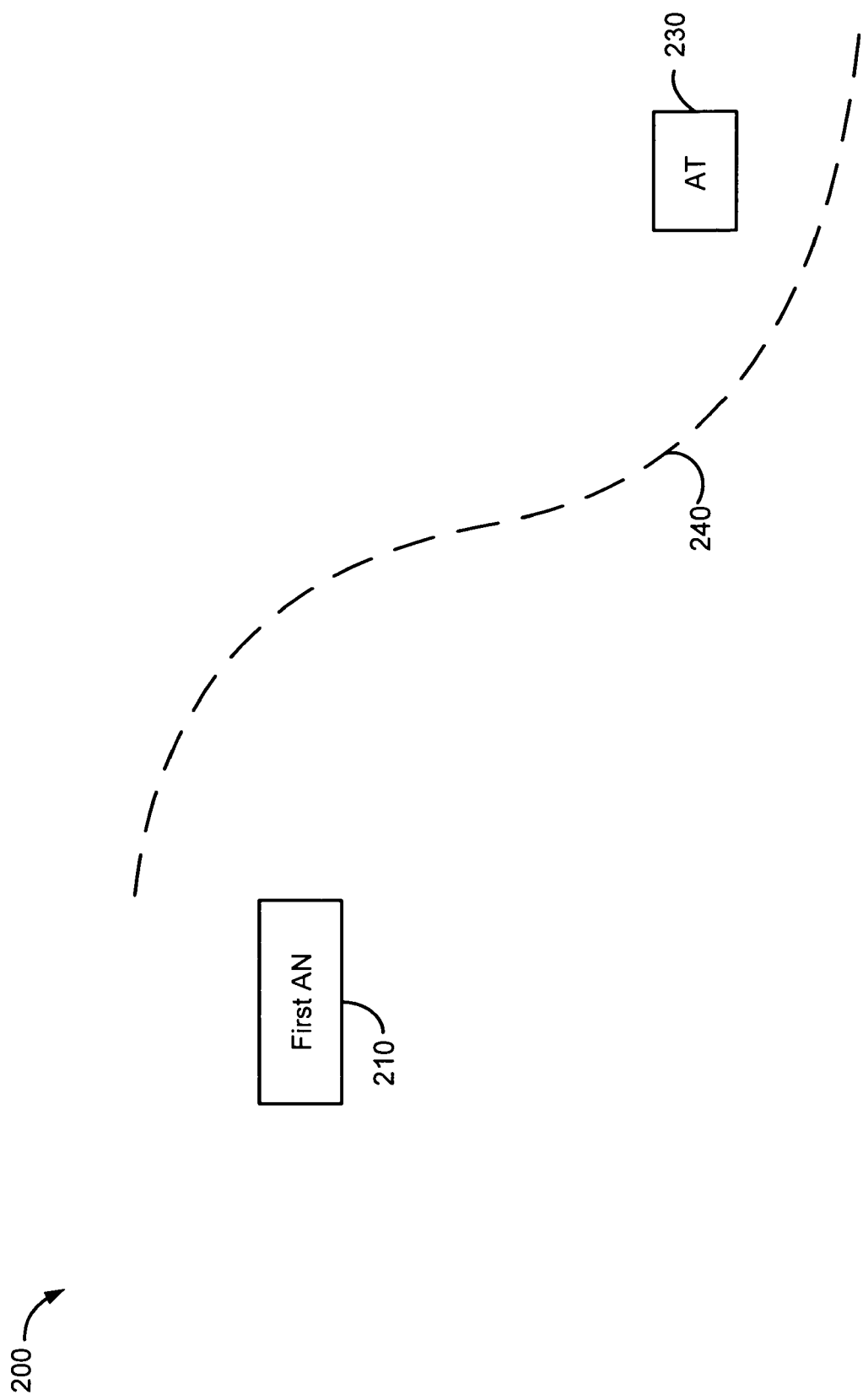

CONNECTION FAILURE REPORTING IN WIRELESS COMMUNICATION SYSTEMS

CLAIM OF PRIORITY UNDER 35 U.S.C. §119

This Application for Patent claims priority to U.S. Provisional Application No. 60/672,577, entitled "Connection Failure Reporting in Wireless Communication Systems," filed on Apr. 19, 2005, which is assigned to the assignee hereof and hereby expressly incorporated by reference herein.

BACKGROUND

1. Field

This disclosure relates generally to wireless communications. More specifically, embodiments disclosed herein relate to methods and systems for reporting connection failures in wireless communication systems.

2. Background

Wireless communication systems are widely deployed to provide various types of communication (e.g., voice, data, etc.) to multiple users. Such systems may be based on code division multiple access (CDMA), time division multiple access (TDMA), frequency division multiple access (FDMA), or other multiple access techniques. A wireless communication system may be designed to implement one or more standards, such as IS-95, cdma2000, IS-856, W-CDMA, TD-SCDMA, and other standards.

As wireless communication systems strive to provide diverse services at high data rates to a growing number of users, there lies a challenge to improve the quality of service and to utilize network resources more efficiently.

BRIEF DESCRIPTION OF THE DRAWINGS

FIGS. 2A and 2B illustrate an embodiment of connection failure reporting in a wireless communication system;

DETAILED DESCRIPTION

Embodiments disclosed herein relate to methods and systems for reporting and compiling connection failures in wireless communication systems.

An access point (AP) disclosed herein may include and/or implement functions of a base-station transceiver system (BTS), an access network transceiver (ANT), a modem pool transceiver (MPT), or a Node B (e.g., in a W-CDMA type system), etc. A cell may refer to a coverage area serviced by an AP. A cell may further include one or more sectors. For simplicity and clarity, the term "sector" may be used herein to refer a cell, or a section of a cell, serviced by an AP. Further, an access network controller (ANC) may refer to the portion of a communication system configured to interface with a core network (e.g., a packet data network) and route data packets between access terminals (ATs) and the core network, perform various radio access and link maintenance functions (such as soft handoff), control radio transmitters and receivers, and so on. An ANC may include and/or implement the functions of a base station controller (BSC), such as found in a $2^{nd}$, $3^{rd}$, or $4^{th}$ generation wireless network. An ANC and one or more APs may constitute part of an access network (AN).

An access terminal (AT) described herein may refer to various types of devices, including (but not limited to) a wireless phone, a cellular phone, a laptop computer, a multimedia wireless device, a wireless communication personal computer (PC) card, a personal digital assistant (PDA), an external or internal modem, etc. An AT may be any data device that communicates through a wireless channel and/or through a wired channel (e.g., by way of fiber optic or coaxial cables). An AT may have various names, such as access unit, access node, subscriber unit, mobile station, mobile device, mobile unit, mobile phone, mobile, remote station, remote terminal, remote unit, user device, user equipment, handheld device, etc. Different ATs may be incorporated into a system. ATs may be mobile or stationary, and may be dispersed throughout a communication system. An AT may communicate with one or more APs on a forward link and/or a reverse link at a given moment. The forward link (or downlink) refers to transmission from an AP to an AT. The reverse link (or uplink) refers to transmission from the AT to the AP.

Figure 1:
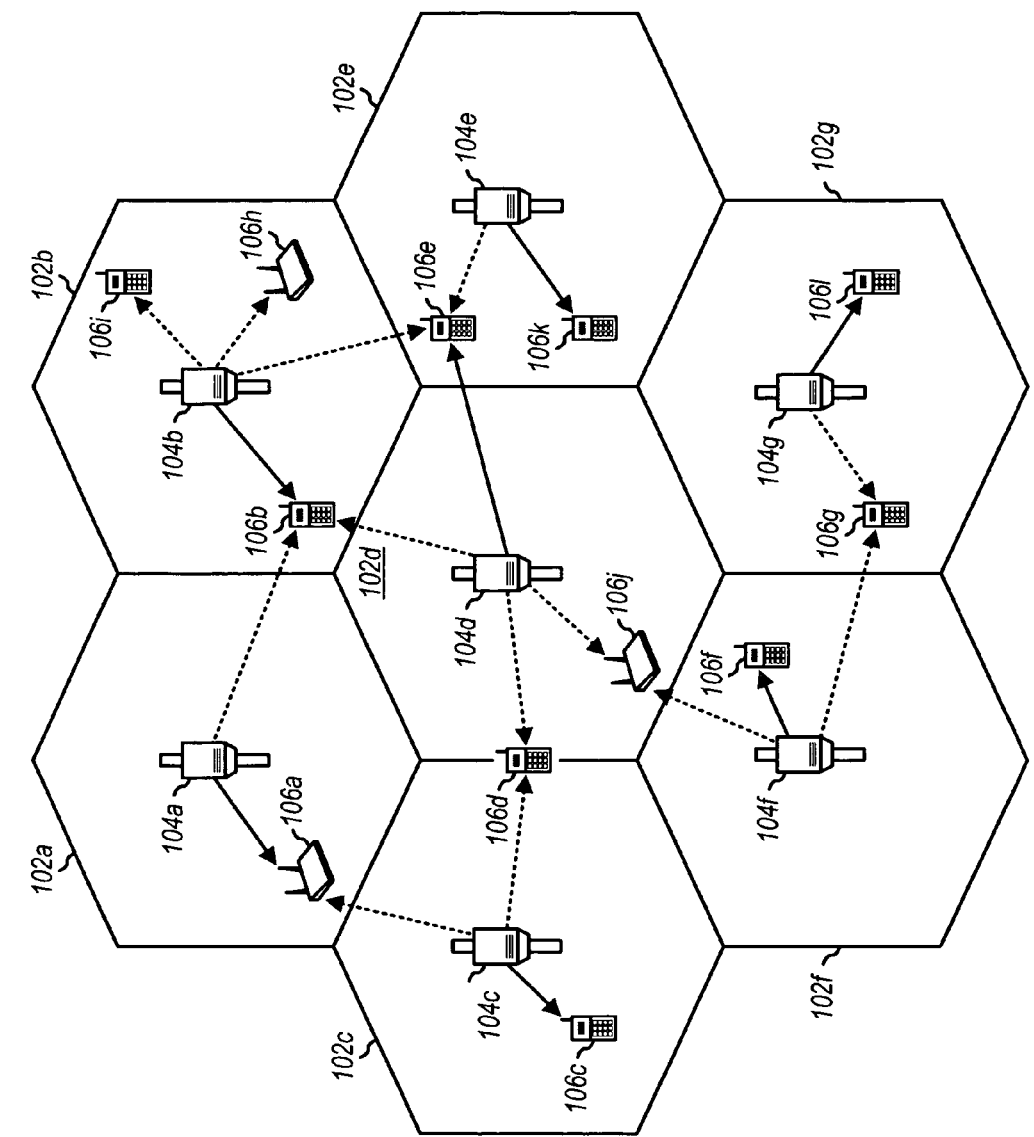
FIG. 1 illustrates an embodiment of a wireless communication system.

FIG. 1 illustrates a wireless communication system 100 configured to support a number of users, in which various disclosed embodiments and aspects may be implemented, as further described below. By way of example, system 100 provides communication for a number of cells 102, including cells 102a-102g, with each cell being serviced by a corresponding AP 104 (such as APs 104a-104g). Each cell may be further divided into one or more sectors. Various ATs 106, including ATs 106a-106k, are dispersed throughout the system. Each AT 106 may communicate with one or more APs 104 on a forward link and/or a reverse link at a given moment, depending upon whether the AT is active and whether it is in soft handoff, for example.

By way of example in FIG. 1, a solid line with an arrow may indicate information (e.g., data) transmission from an AP to an AT. A broken line with an arrow may indicate that the AT is receiving the pilot and other signaling/reference signals (but not data transmission) from the AP. For clarity and simplicity, the reverse link communication is not explicitly shown in FIG. 1. System 100 may be configured to support one or more standards, e.g., IS-95, cdma2000, IS-856, W-CDMA, TD-SCDMA, other standards, or a combination thereof. In an embodiment, for example, system 100 may be a high rate packet data (HRPD) system, such as specified in "cdma2000 High Rate Packet Data Air Interface Specification," 3GPP2 C.S0024-A, Version 2, August 2005 (also referred to as "1×EV-DO").

In current implementations of wireless networks, if there is an unintended connection failure between an AT and an AN, which may for example cause a call to be dropped, or data services (e.g., audio, video, e-mail, web access, and other data services) to be disrupted, there lacks a mechanism for the AT to report such unintended connection failure to the AN. Unintended connection failures ATs experience may be due to a number of factors, such as geographical locations, network infrastructures, deployment, etc.

There may also be situations where an AT intentionally abandons a connection in one communication system (e.g., an HRPD system) due to receiving a page message from another communication system (e.g., a "CDMA2000 1×" type system, such as specified in "Physical Layer Standard for cdma2000 Spectrum Systems," 3GPP2 C.S0002-D, Version 2.0, September 2005). For example, the AT may receive the page message either by tuning away to the other system periodically or through the HRPD system as a tunneled message. In such a case, the HRPD connection is intentionally abandoned (or dropped) by the AT, as opposed to resulting from any unintended failure in the network infrastructure or deployment. Therefore, such a connection failure may not be counted in compiling the connection failure statistics (e.g., for purposes of identifying the problematic spots in the system, etc.).

As illustrated above, an AT may be the entity being able to determine readily and with certainty which connection failures are intentional (e.g., as a result of tuning away to another system) and which ones are unintentional. Thus, it would be useful for ATs to report connection failures to ANs in wireless communication systems, so that the network operators may use the connection failure statistics thus compiled to monitor the overall health of the system, improve the existing network infrastructures/services, and plan for more robust networks in the future.

Embodiments disclosed herein relate to methods and systems for reporting and compiling connection failures in wireless communication systems.

In an embodiment, when an AT experiences a connection failure (e.g., an unintended connection failure), the AT may generate a "connection failure record" associated with the event, and send a message containing the connection failure record (or "connection failure report message") to an AN with which it has since established the connection. (The AN may be the one with which the AT was in communication prior to the connection failure, or a different one, as further described below.) The connection failure record may include (but not limited to): a time stamp associated with the time when the AT detected the connection failure; the sector identification (ID) associated with the reference pilot in the AT's active set when the connection failure occurred; the location information (e.g., the longitude and/or latitude) associated with the sector at which the connection failure occurred (such may help, for example, the network operator to determine the coverage holes), etc.

In some embodiments, the connection failure record may also include a reason (e.g., a "reason code") for the connection failure. For example, the reason code may take values indicated as follows:

| Reason Code | Category |
|---|---|
| 0x0 | General connection failure (excluding failure due to tuning away to another air interface) |
| 0x1 | Connection failure due to tuning away to another air interface |
| 0x2 | Connection failure due to position determination tuning away |

By way of example in the above table, the reason code in the first row represents a category of connection failures (e.g., unintended ones) which may be indicative of the health of the system. The reason codes in the next two rows represent two categories of connection failures which may also be useful for the network operator to keep track of ATs' activities, for example. As such, the inclusion of a reason code in a connection failure record may allow the AN to determine which connection failures are unintended.

The AN (with which the AT has since established the connection) may send a "connection failure report acknowledgement (ACK) message" to the AT, upon reception of the AT's connection failure report message. The AN may for example use the information from the connection failure report message (or forward such information to another AN as further described below) for purposes of compiling the connection failure statistics (e.g., the number of connection failures and associated time occurrences and locations, etc.), so as to identify problematic spots in the system and improve the quality of service.

The AT may purge the connection failure record(s) included in a connection failure report message, upon establishing the connection with and receives a connection failure report ACK message with the matching ID from the AN.

In some embodiments, if the AT cannot establish the connection with an AN after a number of connection attempts, it may store the corresponding connection failure records (e.g., in a memory), and report such later when the AT establishes the connection with an AN. The AT may be allowed to store up a predetermined number of connection failure records, for example. The AT may also repeat the connection attempts according to a predetermined scheme (e.g., waiting for a certain period of time between two successive connection-attempts as further described below). Such may help conserve the AT's battery power.

In an embodiment, for example, if the list of the connection failure records is not empty and the connection is yet to be open, and if the number of connection attempts, N, is less than a predetermined number (e.g., 4), the AT may await T seconds and then perform the following:

$T=m*T$(where m is an integer, e.g., 2)

$N=N+1$

Making another attempt to open a connection and to send a connection failure report message.

Upon purging the connection failure records (after receiving a connection failure report ACK message from the AN such as described above), the AT may reset N to 1 and T to a predetermined period of time (e.g., 60 seconds), for example.

Figure 2B:
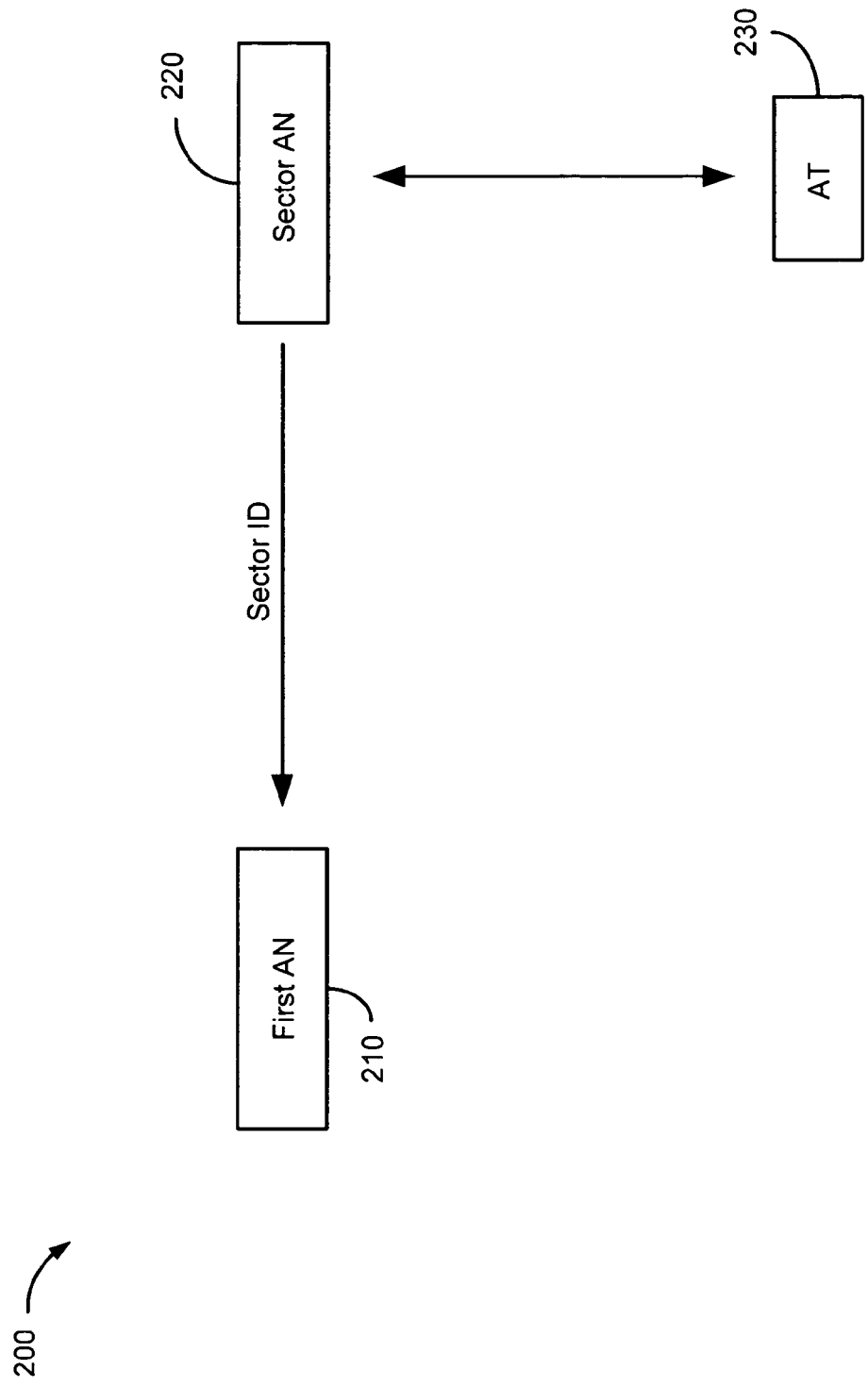

FIGS. 2A-2B illustrates an embodiment 200 of connection failure reporting in a communication system. By way of example in FIG. 2A, an AT 230 may initially be in communication with a first AN 210. AT 230 may then move into an area 240 with no coverage, hence, causing it to lose the connection with first AN 210. Subsequently as illustrated in FIG. 2B, AT 230 may establish the connection with a second AN 220. AT 230 may send a connection failure report message associated with the connection failure it has experienced to second AN 220. Second AN 220 may in turn forward the connection failure information associated with AT 230 to the AN identified by the sector ID included in the connection failure report message (e.g., first AN 210 in this example), so as to help the first AN to compile the connection failure statistics and so on (such as described above).

Figure 3:
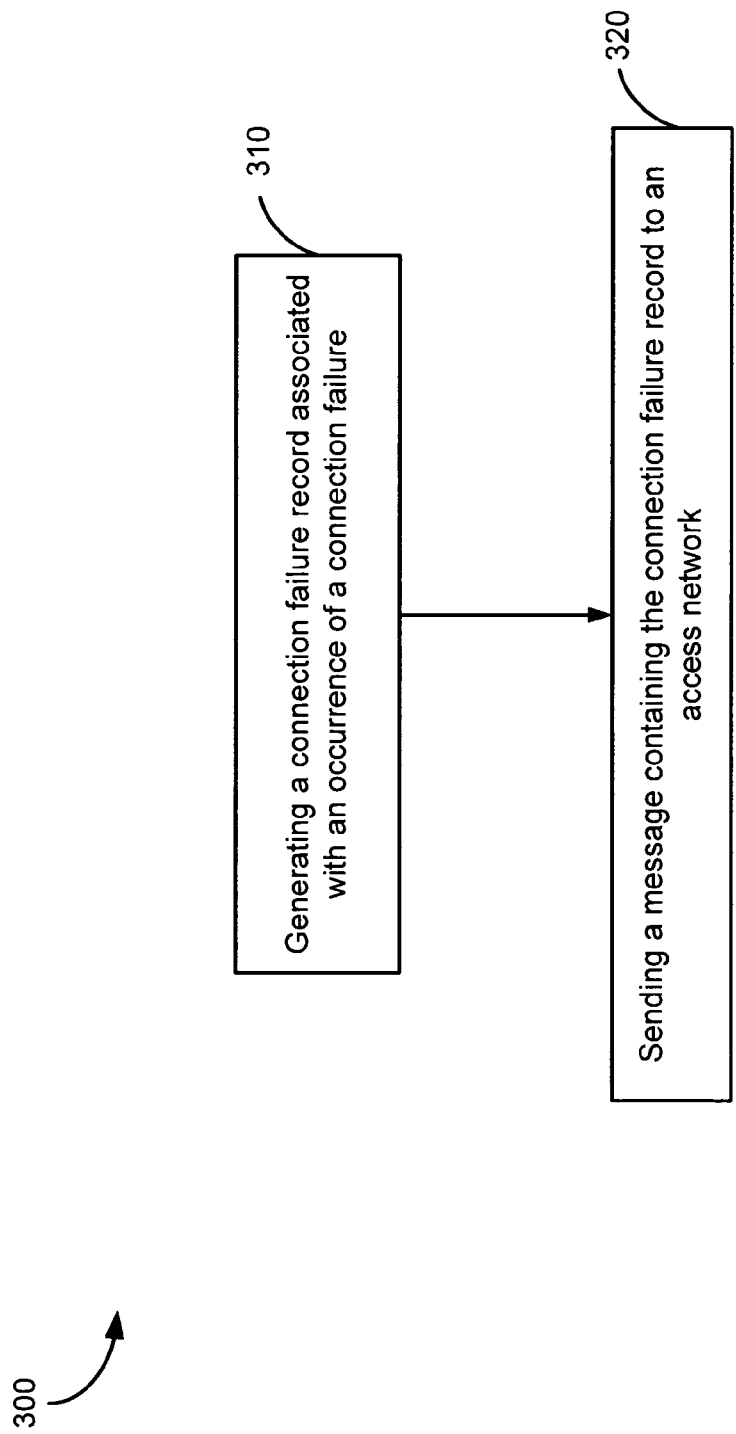
FIG. 3 illustrates a flowchart of a process, which may be used in an embodiment to implement connection failure reporting in a wireless communication system.

FIG. 3 illustrates a flowchart of a process 300, which may be used in an embodiment to implement connection failure reporting and compiling in a wireless communication system. Step 310 generates a connection failure record associated with an occurrence of a connection failure. Step 320 sends a message containing the connection failure record to an access network (such as described above). Process 300 may further include detecting the connection failure (e.g., an unintended one). Process 300 may also include storing the connection failure record (e.g., in a memory). Process 300 may also include receiving a message containing a connection failure report acknowledgement from the access network (and purging the corresponding connection failure record, such as described above).

Figure 4:
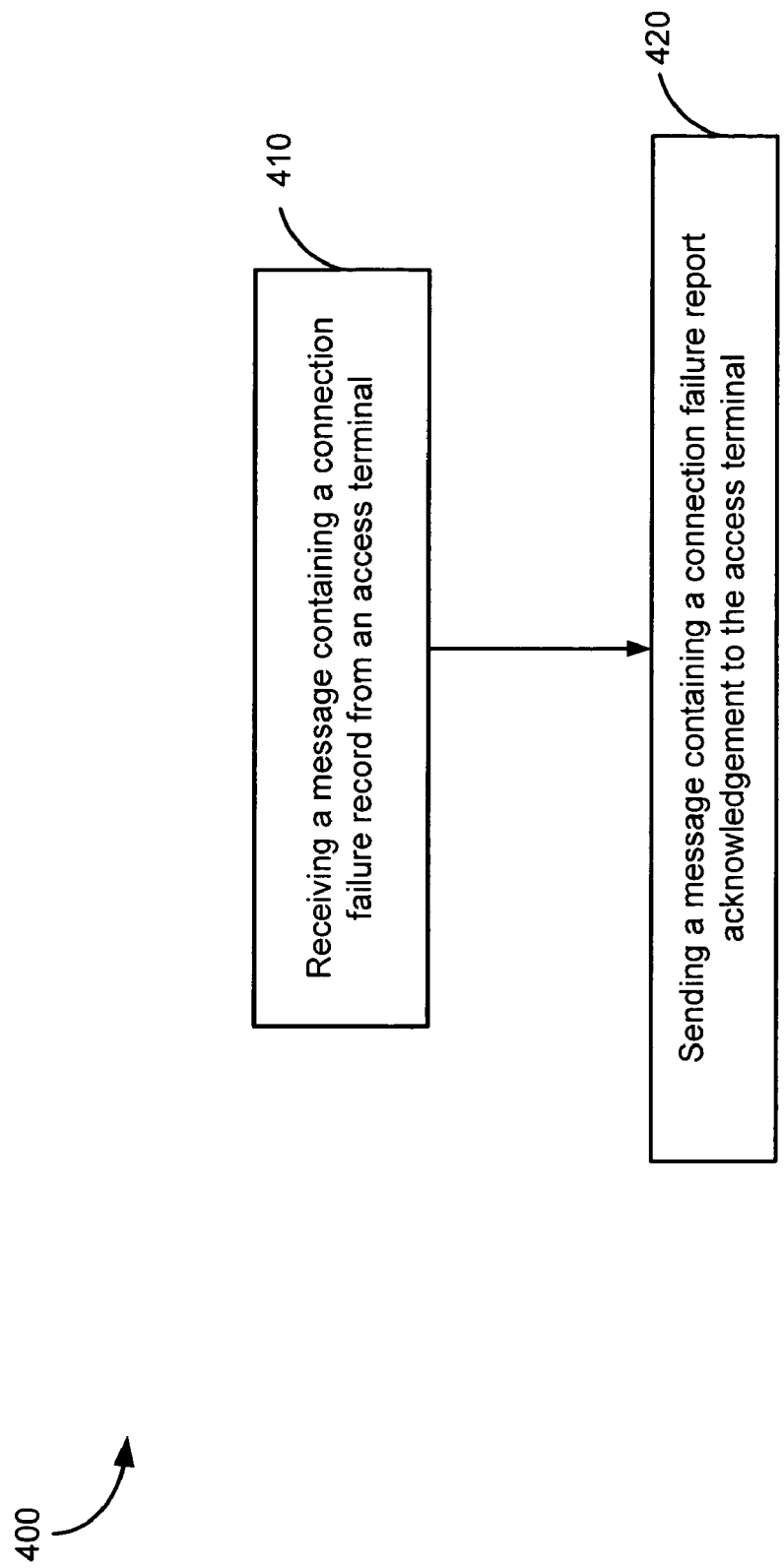
FIG. 4 illustrates a flowchart of a process, which may be used in an embodiment to implement connection failure reporting and compiling in a wireless communication system.

FIG. 4 illustrates a flowchart of a process 400, which may be used in an embodiment to implement connection failure reporting in a wireless communication system. Step 410 receives a message containing a connection failure record from an access terminal. Step 420 sends a message containing a connection failure report acknowledgement to the access terminal. Process 400 may further include compiling the connection failure statistics based on the connection failure record received. Process 400 may also include forwarding the connection failure information associated with the access terminal to an access network identified by the sector ID included in the connection failure record.

Figure 5:
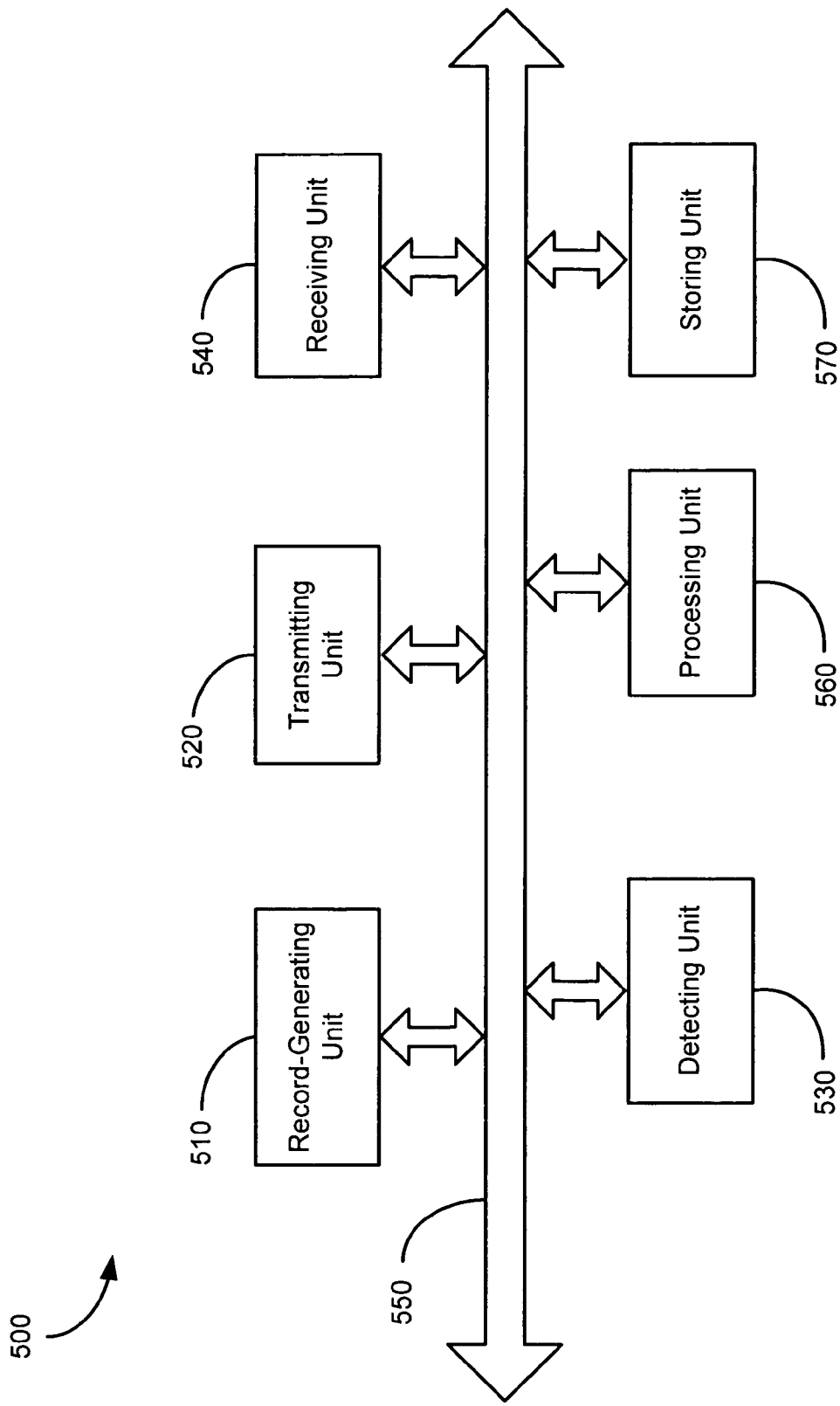
FIG. 5 illustrates a block diagram of an apparatus, in which some disclosed embodiments may be implemented.

FIG. 5 illustrates a block diagram of an apparatus 500, which may be used to implement some disclosed embodiments (such as described above). By way of example, apparatus 500 may include a record-generating unit (or module) 510 configured to generate a connection failure record associated with an occurrence of a connection failure; and a transmitting unit 520 configured to send a message containing the connection failure record to an access network (such as described above). Apparatus 500 may further include a detecting unit 530 configured to detect (or identify) the connection failure (e.g., an unintended one). Apparatus 500 may also include a receiving unit 540 configured to receive a message containing a connection failure report acknowledgement from the access network.

In apparatus 500, record-generating unit 510, transmitting unit 520, detecting unit 530, and receiving unit 540 may be coupled to a communication bus 550. A processing unit 560 and a storing unit 570 may also be coupled to communication bus 550. Processing unit 560 may be configured to control and/or coordinate the operations of various units. Storing unit 570 may store instructions to be executed by processing unit 560. In some embodiments, storing unit 570 may also be configured to store the connection failure record(s), such as described above.

Figure 6:
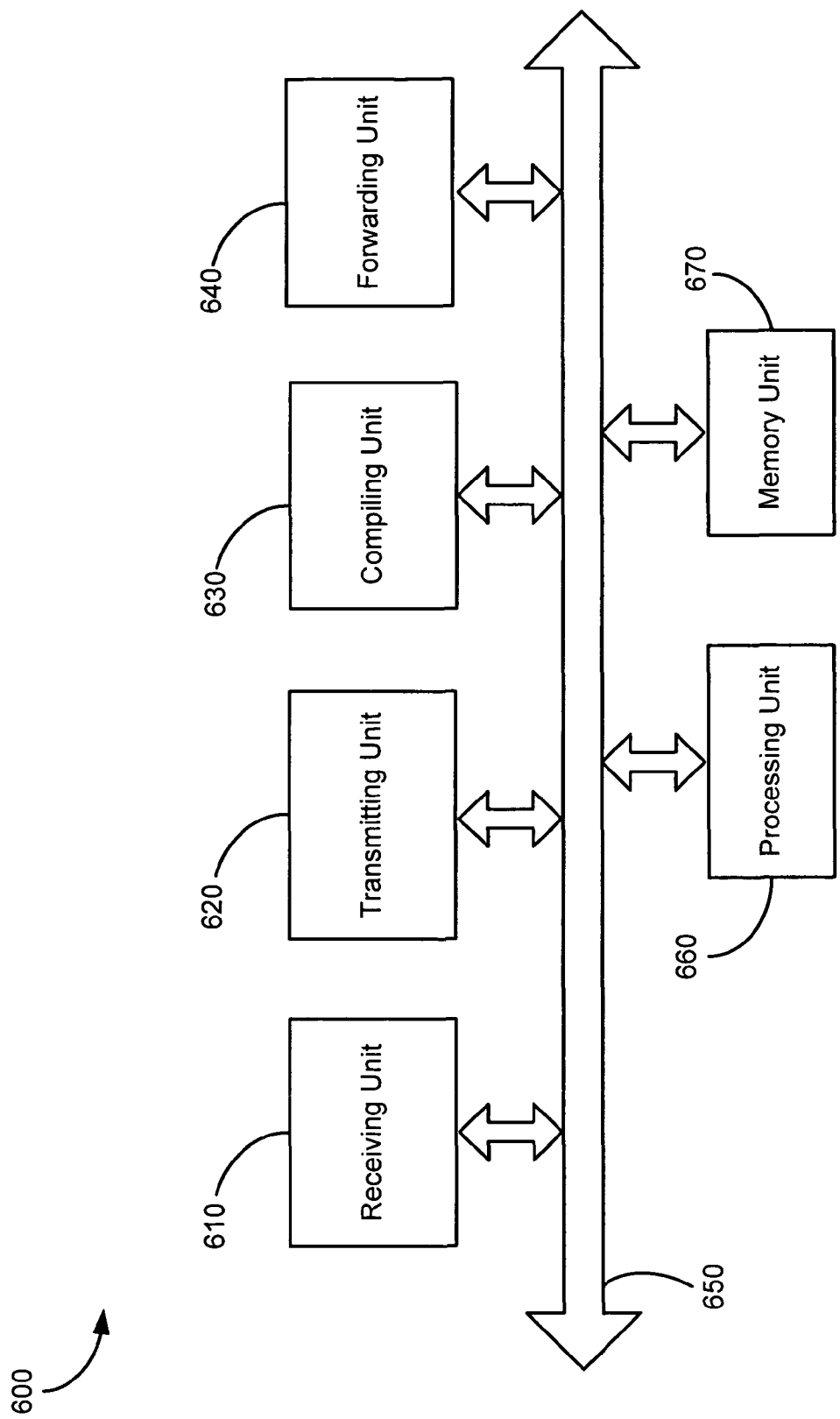
FIG. 6 illustrates a block diagram of an apparatus, in which some disclosed embodiments may be implemented.

FIG. 6 illustrates a block diagram of an apparatus 600, which may be used to implement some disclosed embodiments (such as described above). By way of example, apparatus 600 may include a receiving unit (or module) 610 configured to receive a message containing a connection failure record from an access terminal, and a transmitting unit 620 configured to send a message containing a connection failure report acknowledgement to the access terminal. Apparatus 600 may further include a compiling unit 630 configured to compile the connection failure statistics based on the connection failure record received. Apparatus 600 may also include a forwarding unit 640 configured to forward the connection failure information associated with the access terminal to an access network identified by the sector ID included in the connection failure record.

In apparatus 600, receiving unit 610, transmitting unit 620, compiling unit 630, and forwarding unit 640 may be coupled to a communication bus 650. A processing unit 660 and a memory unit 670 may also be coupled to communication bus 650. Processing unit 660 may be configured to control and/or coordinate the operations of various units. Memory unit 670 may embody instructions to be executed by processing unit 660.

Various disclosed embodiments may be implemented in an AT, an AN, and other wireless communication systems or devices.

Various units/modules in FIGS. 5-6 and other embodiments may be implemented in hardware, software, firmware, or a combination thereof. Various units/modules described herein may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (or a processing unit). The memory unit may be implemented within the processor or external to the processor, in which case it can be communicatively coupled to the processor via various means known in the art.

Embodiments disclosed herein provide some embodiments of RLPs and implementations thereof for multi-link communication systems. There are other embodiments and implementations. Various disclosed embodiments may be implemented in a BTS, a BSC, an AT, and other senders and receivers configured for communication systems.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an AT. In the alternative, the processor and the storage medium may reside as discrete components in an AT.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, comprising:
generating a connection failure record associated with an occurrence of a connection failure, wherein the connection failure record comprises a reason code, wherein a value of the reason code is selected from at least two possible values, wherein the at least two possible values comprise a first value that indicates that the connection failure is unintended and a second value that indicates that the connection failure is intentional; and
sending a message containing the connection failure record to an access network.

2. The method of claim 1, wherein the connection failure record also includes at least one of a timestamp associated with a time when the connection failure is detected, a sector identification associated with a reference pilot in an active set of an access terminal (AT) when the connection failure occurred, and a location information associated with a sector at which the connection failure occurred.

3. The method of claim 1, wherein the connection failure record is associated with an unintended connection failure.

4. The method of claim 1, further comprising sending the message containing the connection failure record to the access network upon establishing a connection with the access network.

5. The method of claim 4, further comprising receiving a message containing a connection failure report acknowledgment from the access network.

6. The method of claim 5, further comprising purging the connection failure record upon receiving the message containing the connection failure report acknowledgement from the access network.

7. The method of claim 1, further comprising storing the connection failure record.

8. The method of claim 1, wherein the value of the reason code is selected from at least three possible values, and wherein the at least three possible values comprise:
a first value that indicates that the connection failure is unintended;
a second value that indicates that the connection failure is intentional due to tuning away to another air interface; and
a third value that indicates that the connection failure is intentional due to tuning away for position determination.

9. A method for wireless communications, comprising:
receiving a message containing a connection failure record from an access terminal, the connection failure record associated with an occurrence of a connection failure, wherein the connection failure record comprises a reason code and a sector identifier associated with a reference pilot in an active set of an access terminal (AT) when the connection failure occurred, wherein a value of the reason code is selected from at least two possible values, wherein the at least two possible values comprise a first value that indicates that the connection failure is unintended and a second value that indicates that the connection failure is intentional; and
sending a message containing a connection failure report acknowledgement to the access terminal.

10. The method of claim 9, wherein the connection failure record also includes at least one of a timestamp associated with a time when the connection failure is detected and a location information associated with a sector at which the connection failure occurred.

11. The method of claim 9, further comprising compiling connection failure statistics based in part on the connection failure record.

12. The method of claim 9, further comprising forwarding information associated with the connection failure to an access network identified by a sector identification included in the connection failure record.

13. The method of claim 9, wherein the connection failure record is associated with an unintended connection failure.

14. An apparatus configured for wireless communications, comprising:
means for generating a connection failure record associated with an occurrence of a connection failure, wherein the connection failure record comprises a reason code, wherein a value of the reason code is selected from at least two possible values, wherein the at least two possible values comprise a first value that indicates that the connection failure is unintended and a second value that indicates that the connection failure is intentional; and
means for sending a message containing the connection failure record to an access network.

15. The apparatus of claim 14, wherein the connection failure record includes at least one of a timestamp associated with a time when the connection failure is detected, a sector identifier associated with a reference pilot in an active set of an access terminal (AT) when the connection failure occurred, and a location information associated with a sector at which the connection failure occurred.

16. The apparatus of claim 14, wherein the connection failure record is associated with an unintended connection failure.

17. The apparatus of claim 14, wherein the means for sending is further configured to send the message containing the connection failure record to the access network upon establishing a connection with the access network.

18. The apparatus of claim 14, further comprising a receiving unit configured to receive a message containing a connection failure report acknowledgment from the access network.

19. The apparatus of claim 14, further comprising a storing unit configured to store the connection failure record.

20. The apparatus of claim 19, wherein the connection failure record is purged upon receiving a message containing a connection failure report acknowledgement from the access network.

21. The apparatus of claim 14, further comprising a detecting unit configured to detect the connection failure.

22. An apparatus configured for wireless communications, comprising:
- means for receiving a message containing a connection failure record from an access terminal, the connection failure record associated with an occurrence of a connection failure, wherein the connection failure record comprises a reason code and a sector identifier associated with a reference pilot in an active set of an access terminal (AT) when the connection failure occurred, wherein a value of the reason code is selected from at least two possible values, wherein the at least two possible values comprise a first value that indicates that the connection failure is unintended and a second value that indicates that the connection failure is intentional; and
- means for sending a message containing a connection failure report acknowledgement to the access terminal.

23. The apparatus of claim 22, wherein the connection failure record also includes at least one of a timestamp associated with a time when the connection failure is detected and a location information associated with a sector at which the connection failure occurred.

24. The apparatus of claim 22, further comprising means for compiling connection failure statistics based in part on the connection failure record.

25. The apparatus of claim 22, further comprising means for forwarding information associated with the connection failure to an access network identified by a sector identification included in the connection failure record.

26. A mobile station configured for connection failure reporting, comprising:
- a processor;
- memory in electronic communication with the processor; and
- instructions stored in the memory, the instructions being executable by the processor to:
  - generate a connection failure record associated with an occurrence of a connection failure, wherein the connection failure record comprises a reason code, wherein a value of the reason code is selected from at least two possible values, wherein the at least two possible values comprise a first value that indicates that the connection failure is unintended and a second value that indicates that the connection failure is intentional; and
  - send a message containing the connection failure record to an access network.

27. A computer-readable storage medium having instructions thereon, the instructions comprising:
- code for generating a connection failure record associated with an occurrence of a connection failure, wherein the connection failure record comprises a reason code,
  - wherein a value of the reason code is selected from at least two possible values,
  - wherein the at least two possible values comprise a first value that indicates that the connection failure is unintended and a second value that indicates that the connection failure is intentional; and
- code for sending a message containing the connection failure record to an access network.

* * * * *